R. D. MERSHON.
ELECTROLYTIC APPARATUS EMPLOYING FILMED ELECTRODES.
APPLICATION FILED JUNE 19, 1913.
1,141,402. Patented June 1, 1915.
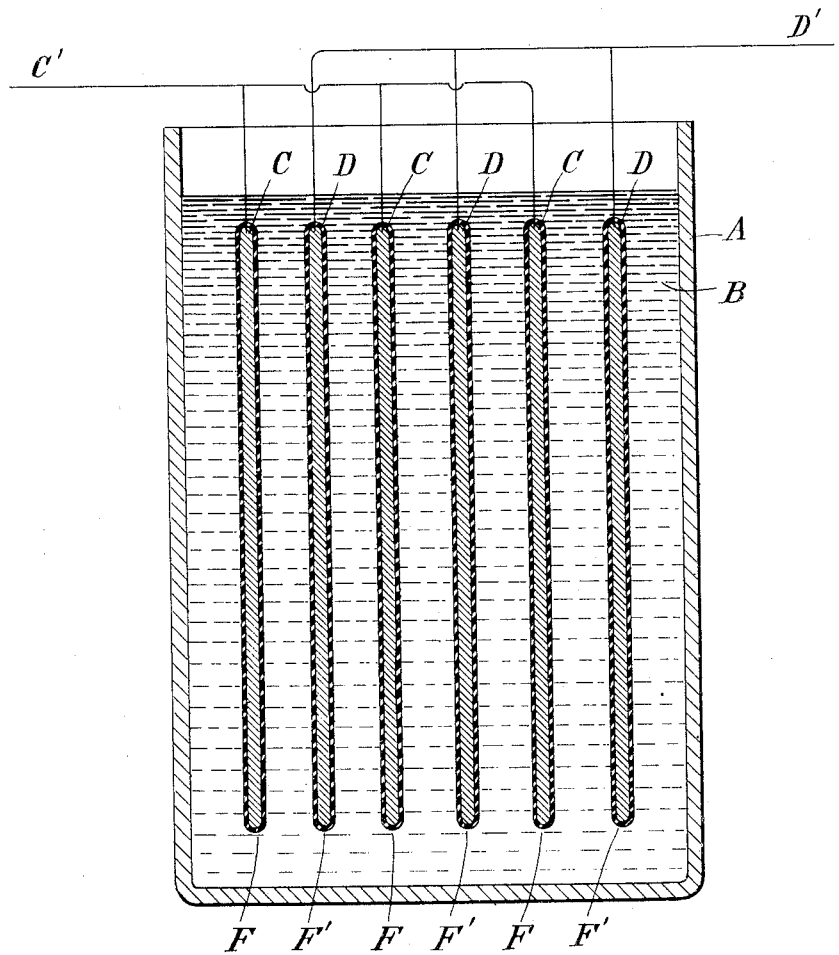

UNITED STATES PATENT OFFICE.

RALPH D. MERSHON, OF NEW YORK, N. Y.

ELECTROLYTIC APPARATUS EMPLOYING FILMED ELECTRODES.

1,141,402.  Specification of Letters Patent.  Patented June 1, 1915.

Application filed June 19, 1913. Serial No. 774,562.

*To all whom it may concern:*

Be it known that I, RALPH D. MERSHON, a citizen of the United States, residing at New York, in the county and State of New York, have invented certain new and useful Improvements in Electrolytic Apparatus Employing Filmed Electrodes, of which the following is a full, clear, and exact description.

As is well known, the action of electrolytic condensers, rectifiers, and similar devices depends upon the film which may be formed upon the surface of the aluminum, tantalum, magnesium and other metals when immersed in certain electrolytes and subjected to the electric current. In order, however, that the film produced in the ordinary manner shall evidence to an efficient degree its necessary qualities of high specific resistance and high dielectric strength the temperature at which the film-coated electrode is used must not be much, if any, above a certain value. As the temperature approaches such value (about 40° C. in the case of the electrodes and electrolytes most commonly used) the film begins to lose these good qualities, the impairment above this critical temperature being very marked.

In my prior Patents No. 1,012,889, issued December 26th, 1911, and No. 1,065,704, issued June 24, 1913, I have described several effective methods of forming films which possess marked temperature-resistant properties, and in the application mentioned I have described and claimed broadly the article having such a film. Reference may be made to said patent and application for a full and detailed description of the preferred modes of procedure in producing the film.

In producing the film for use the essential feature of the process is that the film, during or after its formation, is subjected to a higher temperature than that to which it is to be subjected in actual use. Preferably I proceed as follows:

The electrode (or other article) is formed in any desired manner, and the surface or surfaces to be filmed should, for the best results, be chemically clean. The article is then immersed entirely or as far up as the film is to extend, in a solution, preferably saturated, of borax or other suitable film-producing agent, and is connected to one terminal of a source of current, either alternating or direct, at a suitable voltage as will be explained hereinafter. The other terminal of the source is connected to the electrolyte as by means of a suitable cathode immersed therein or by connecting the terminal to the vessel containing the electrolyte if such vessel is of conducting material. The solution or electrolyte being at boiling temperature (and preferably under pressure, so that the actual temperature will be higher than the boiling point at atmospheric pressure) the current is turned on. If a suitable measuring instrument, for example an ammeter when direct current is used, or a wattmeter when the current is alternating, is connected in the circuit it will be found that the current flowing begins to fall in value some time after the circuit is closed. This fall is at first comparatively rapid, then less and less rapid, until a point is reached where the decrease is almost, if not entirely, imperceptible. The circuit can now be opened and the article removed from the electrolyte; or the article may be left in the electrolyte while the same is cooling, with or without the current being continued during all or part of the time of cooling. On examining the article it will be found coated with a closely adherent film, harder than the metal on which it is formed and less subject to scratching and abrasion, resistant to acids, and in color varying from bronze to greenish bronze or brownish bronze.

As stated above, I prefer to start the formation of the film with the film-producing agent (in the present instance the borax solution) at boiling temperature, but this is not essential. Instead, the solution may be cold at the start and have its temperature raised as the formation of the film goes on. It is desirable, however, that the solution be boiling when the forming current is turned off, as the agitation caused by the boiling prevents bubbles adhering to the surface of the article. These bubbles, if allowed to remain, apparently prevent the complete development of the film under the bubbles, with the result that in after use the film has less durability at such points. If the solution does not begin to boil until about the time the forming current reaches its minimum value it is preferable that the process be continued, with the solution boiling, for some time, to insure that any points that may have been protected by bubbles may be as heavily coated as the rest. If the electrode, for subsequent use in a condenser, rectifier or other electrolytic apparatus, is crimped or corrugated, bubbles resulting from the electrolytic action in the forming bath find lodgment in the grooves or crevices of the plate and do not float off readily. Accordingly I am careful, in treating such plates, to have the bath boiling briskly for some time before the current is turned off. Preferably I have the bath boiling when the current is turned on and keep it boiling throughout the treatment.

The thickness of the film thus produced electrolytically is believed to depend almost directly upon the final voltage employed in its formation, up to a certain limiting voltage the value of which is dependent upon the metal and the film-producing agent used with it. In general, this limiting voltage evidences itself by the fact that if it or a higher voltage be maintained the current flowing does not fall or falls very little. In practice I prefer to start with a low voltage and then increase the same from time to time as the film builds up, as evidenced by decrease of the current. If instead of using a simple solution of a film-forming salt as above described, the bath be acidulated with one or another of the acids whose salts may be used as film-producing agents, as for example borax, or phosphoric acid, etc., the process of forming the heat-treated film is considerably expedited. The amount of acid used may be varied according to circumstances but I have obtained good results with a bath made up in the proportion of two gallons of the saturated borax solution, three pounds of boric acid, and an additional half pound of borax.

The film produced as above described is believed to be composed in part of the metal on which it is formed in chemical combination with one or more of the elements composing the bath. Thus in the case of aluminum treated in a borax solution the film is composed in part of aluminum. I am not certain what the other constituent or constituents are, but careful analysis indicates that the film is a form of, or is composed largely of, aluminum hydrate.

In using direct current in the forming process the cathode, by which the negative terminal of the source of current is connected to the electrolyte or bath, may be either of filming or, preferably, non-filming material, and the use of the latter is assumed in the foregoing description of the process. It appears that when the film is formed in an unacidulated electrolyte the high temperature employed effects a change in the composition of the electrolyte as well as in the nature of the film itself. For example, if with direct current and an unacidulated electrolyte the cathode be made of metal capable of forming a film in the electrolyte used, the cathode is attacked and there is thrown down in the electrolyte a quantity of material more or less insoluble. The bulk of this material in the case of aluminum electrodes consists of aluminum hydrate, and some iron hydrate is found mixed with it, presumably from impurities in the aluminum. There also appear to be small quantities of a compound, possibly an aluminate, formed between the aluminum and the base of the electrolyte, and also small quantities of the acid (free) of the electrolyte.

I have discovered that while electrodes having the heat-resistant films described above can be advantageously used in any electrolyte, in an electrolytic condenser, rectifier, lightning arrester or other apparatus, they do not evidence to the fullest extent their remarkable property of withstanding high temperatures unless they are used (1) in the identical solution, originally acidulated or unacidulated, in which the films were formed or subjected to the heat-treatment; or, (2) in some other, but acidulated, electrolyte. That is, if the films are not used in the identical electrolyte of their formation or heat-treatment, then whatever electrolyte they are used in must be acidulated. It is this discovery that forms the subject of the present application for Letters Patent. In the appended claims I have used the term "an original electrolyte" to mean the first electrolyte or its equivalent, an acidulated electrolyte.

The nature and amount of the acid or acids used to acidulate the new or fresh electrolyte may vary widely. In general, the acid should be one a salt of which can be used as a film-producing agent, as for example boric or phosphoric acid. Thus boric acid may be used in a phosphate electrolyte, and phosphoric acid in a borax electrolyte. The quantity of the free acid used may be large or small, but in my extended tests and practical experiments I have secured the best results (that is, the best results obtainable with a fresh electrolyte) with an electrolyte of the following proportions: distilled water, one gallon; boric acid, one and a half pounds; borax, one quarter pound.

In the accompanying drawing I have shown in diagrammatic cross section a simple electrolytic condenser. Therein, A designates the vessel containing the electrolyte B. C and D are the condenser electrodes or plates, connected to terminals C', D'. The heat-resistant dielectric films, greatly exaggerated in thickness, are designated by F, F'. The electrolyte, B, is one or the other of the two described above, namely, the identical electrolyte in which the films F, F', were formed or subjected to the necessary heat-treatment; or some other electrolyte, which is acidulated.

Films of the kind described herein are producible only by electrolytic action, and accordingly they can be conveniently referred to in the claims as "electrolytic films". They are composed, in part at least, of the underlying metal, and are characterized by high density, high specific resistance and dielectric strength, close adherence to the underlying metal, and capability of resisting electrolytic attack at high temperatures, as described in my prior Patent No. 1,065,704, above mentioned.

What I claim is:

1. An electrolytic apparatus comprising a containing vessel, electrodes therein having heat-resistant electrolytic films, and an original electrolyte contained in the vessel and immersing the electrodes.

2. An electrolytic apparatus comprising a containing vessel; electrodes therein coated with heat-resistant, electrolytic films; and an original electrolyte in the vessel, immersing the electrodes and containing a film-producing material in solution.

3. An electrolytic apparatus comprising a containing vessel; electrodes therein, coated with heat-resistant electrolytic films; and an original electrolyte in the vessel, containing borax.

4. An electrolytic condenser comprising a containing vessel; aluminum electrodes therein, coated with heat-resistant electrolytic films; and an original electrolyte in the vessel.

5. An electrolytic condenser comprising a containing vessel; aluminum electrodes therein, coated with heat-resistant electrolytic films; and an original electrolyte in the vessel, containing borax and a free acid.

In testimony whereof I affix my signature in the presence of two subscribing witnesses.

RALPH D. MERSHON.

Witnesses:
THOMAS J. BYRNE,
S. S. DUNHAM.

DISCLAIMER 1,141,402.—*Ralph D. Mershon*, New York, N. Y. ELECTROLYTIC APPARATUS EMPLOYING FILMED ELECTRODES. Patent dated June 1, 1915. Disclaimer filed November 19, 1929, by the patentee, licensee, *The Amrad Corporation*, acquiescing.

Therefore disclaims from the scope of said Letters Patent any acidulated electrolyte which is not acidulated with an inorganic acid such as boric or phosphoric acid.

[*Official Gazette December 10, 1929.*]